(12) United States Patent
Peale

(10) Patent No.: US 7,916,985 B2
(45) Date of Patent: Mar. 29, 2011

(54) INTEGRATED VISIBLE PILOT BEAM FOR NON-VISIBLE OPTICAL WAVEGUIDE DEVICES

(75) Inventor: David R. Peale, San Diego, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 245 days.

(21) Appl. No.: 11/844,797

(22) Filed: Aug. 24, 2007

(65) Prior Publication Data

US 2008/0198385 A1  Aug. 21, 2008

Related U.S. Application Data

(60) Provisional application No. 60/890,593, filed on Feb. 19, 2007.

(51) Int. Cl.
  *G02B 6/32* (2006.01)
  *G02B 6/26* (2006.01)
(52) U.S. Cl. .......................................... 385/31; 385/16
(58) Field of Classification Search .................. 385/31, 385/16
  See application file for complete search history.

(56) References Cited

U.S. PATENT DOCUMENTS

| | | | |
|---|---|---|---|
| 5,617,207 A * | 4/1997 | Glass et al. ................... 356/477 |
| 6,485,413 B1 * | 11/2002 | Boppart et al. ................ 600/160 |
| 6,847,454 B2 * | 1/2005 | Crowley et al. ............... 356/479 |
| 6,940,601 B2 * | 9/2005 | Englund et al. ............... 356/477 |
| 7,538,886 B2 * | 5/2009 | Feldchtein .................... 356/497 |
| 2003/0156296 A1 * | 8/2003 | Englund et al. ............... 356/477 |
| 2003/0174339 A1 * | 9/2003 | Feldchtein et al. ........... 356/479 |
| 2004/0076390 A1 * | 4/2004 | Dong Yang et al. .......... 385/116 |
| 2005/0035295 A1 * | 2/2005 | Bouma et al. ............. 250/341.1 |
| 2006/0195019 A1 * | 8/2006 | Premachandran et al. ... 600/300 |
| 2007/0024869 A1 * | 2/2007 | Ostrovsky et al. ............ 356/511 |
| 2007/0115476 A1 * | 5/2007 | Feldchtein et al. ........... 356/479 |
| 2007/0171425 A1 * | 7/2007 | De Groot et al. ............. 356/478 |
| 2008/0049229 A1 * | 2/2008 | Feldchtein .................... 356/479 |
| 2008/0055603 A1 * | 3/2008 | Amazeen et al. ............. 356/446 |
| 2008/0062429 A1 * | 3/2008 | Liang et al. ................... 356/497 |
| 2008/0118886 A1 * | 5/2008 | Liang et al. ..................... 433/29 |
| 2008/0165347 A1 * | 7/2008 | Groot et al. ..................... 356/73 |
| 2008/0285913 A1 * | 11/2008 | Yang et al. ...................... 385/24 |
| 2009/0131800 A1 * | 5/2009 | Liang ............................. 600/476 |

* cited by examiner

*Primary Examiner* — K. Cyrus Kianni
(74) *Attorney, Agent, or Firm* — Luedeka, Neely & Graham, P.C.

(57) ABSTRACT

In one embodiment, a radiation based analysis system comprises a first radiation source to generate first radiation having a wavelength outside the visible spectrum, a second radiation source to generate second radiation having a wavelength within the visible spectrum, and a waveguide coupler to couple a portion of the first radiation and a portion of the second radiation into a combined radiation beam such that the first radiation and the second radiation follow a path that is substantially coaxial.

5 Claims, 5 Drawing Sheets

0:100

INTEGRATED VISIBLE PILOT BEAM FOR NON-VISIBLE OPTICAL WAVEGUIDE DEVICES

RELATED APPLICATIONS

This application claims the benefit of U.S. Provisional Patent Application Ser. No. 60/890,593, filed Feb. 19, 2007, entitled INTEGRATED VISIBLE PILOT BEAM FOR NON-VISIBLE OPTICAL WAVEGUIDE DEVICES, the disclosure of which is incorporated herein by reference in its entirety.

BACKGROUND

The subject matter described herein relates generally to optics, and more particularly to optical waveguide components and systems.

Radiation-based measurement tools such as, e.g., interferometers, surface analyzers, and the like may use radiation outside the spectrum that is normally visible to the unassisted human eye. The use of radiation having a wavelength outside the visible spectrum, or in a location of reduced sensitivity, creates particular challenges in using a measurement tool. For example, interferometers may require a specific alignment between the interferometer and an object or surface being analyzed. Similarly, other surface scanning devices may require a specific alignment or orientation between one or more tools and an object. The absence of visible light creates particular difficulties with assembly, setup, and operation of the device.

Tools such as, e.g., infrared viewers, alone or in combination with cameras or video systems, may be used to align an infrared beam. However, this technique requires additional equipment and is more time consuming than aligning a visible beam.

Hence, additional systems and methods to align radiation-based inspection systems may find utility.

DETAILED DESCRIPTION

Described herein are exemplary systems and methods for causing visible and invisible optical beams to travel along the same waveguide so that an instrument may use an invisible beam to perform a useful measurement while the visible beam allows the approximate path and destination of the invisible beam to be readily visualized by the user. Throughout this document, terms like light, optical, optics, rays and beams with reference to electromagnetic radiation will be used with no implication that the radiation is or is not in the visible portion of the spectrum. The visible spectrum will be used to refer to the wavelength range within which radiation is visible to the human eye.

In the following description, numerous specific details are set forth in order to provide a thorough understanding of various embodiments. However, it will be understood by those skilled in the art that the various embodiments may be practiced without the specific details. In other instances, well-known methods, procedures, components, and circuits have not been described in detail so as not to obscure the particular embodiments.

Figure 1:
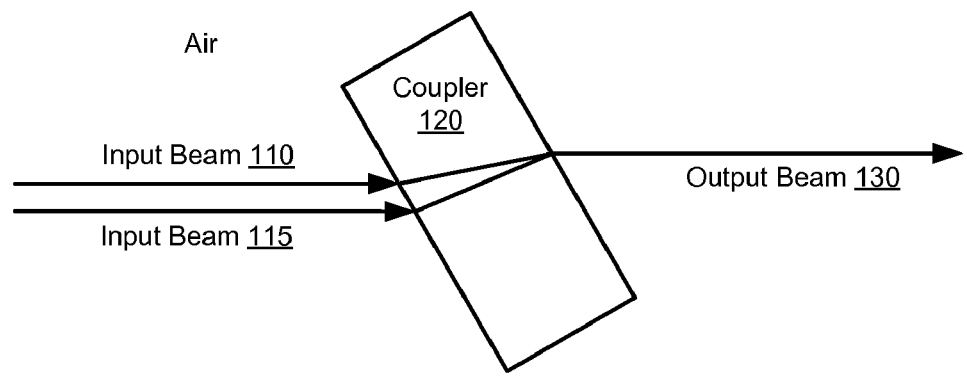
FIGS. 1 and 2 are schematic illustrations of optical alignment components according to embodiments.
Figure 2:
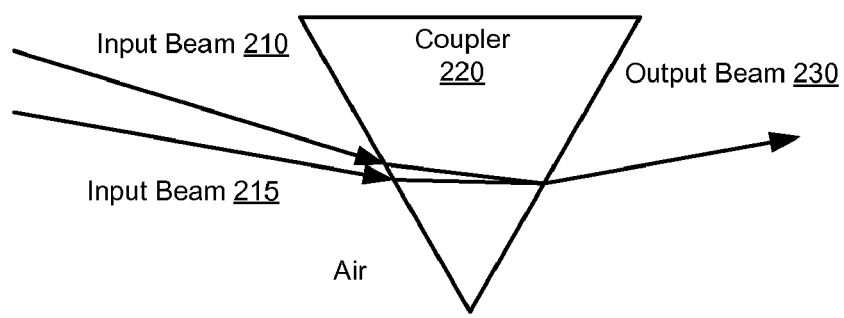

FIGS. 1-2 are schematic illustrations of optical alignment components according to embodiments. Referring to FIG. 1, two parallel input beams 110, 115 of different wavelengths are shown passing from the left through a slab 120 formed of dispersive media (e.g. glass) and emerging as a substantially collinear beam 130. The region around the slab 120 can be dispersive or non-dispersive and, in most embodiments, may be air. One input beam 110 may comprise radiation that is not within the visible spectrum, while another input beam 115 may comprise radiation that is within the visible spectrum.

In some embodiments, the distance between parallel rays, angle of incidence upon entering the slab and thickness of the slab may be selected such that the first beam 110 and the second beam 115 exit the slab 120 at substantially the same location and along substantially the same path. Thus, slab 120 essentially combines the first beam 110 and the second beam 115 into a single beam 130 having a first component that is within the visible spectrum and a second component that is outside the visible spectrum. The first component and the second component are substantially coaxial. As used herein, the phrase "substantially coaxial" should be construed liberally, consistent with requirements of practical optical engineering applications, rather than strictly in accordance with theoretical definitions of the term "coaxial." Thus, minor deviations in the direction of outputs generated by input beams 110 and 115 may be accommodated as being within normal engineering tolerances.

Thus, in the embodiment depicted in FIG. 1, the index of refraction is lower (i.e., closer to one) for the first beam 110 than the second beam 115. For example, in one embodiment the first beam 110 may be an infrared beam and the second beam 115 may be a visible beam.

Such beam combining slabs are of limited utility because for reasonable thicknesses (e.g., approximately 10 millimeters), and at non-glancing incidence angles (e.g., 45°), the two input beams 110, 115 may be separated by a very small distance, (i.e., several tens of microns).

FIG. 2 depicts an alternate embodiment in which a coupler 220 is embodied as a dispersive prism, which permits the two input beams 210, 215 to arrive from different directions. This permits the radiation sources which generate the first beam 210 and the second beam 215 to be physically separated by a greater distance.

With the development of waveguide optics, it is possible to perform complex optical operations in more confined spaces. However, it is not possible for the free space techniques described in FIGS. 1 and 2 to be applied in waveguide optics. Instead, there are a number of structures and devices which may be used to couple radiation beams propagating in separate waveguides. For example, one such device is an evanescent coupler. In general, evanescent couplers are structured to bring two or more beams into close physical proximity for a predetermined interaction length. Radiation propagating through the waveguides is made to "tunnel" or couple from one waveguide to another waveguide.

The specific performance characteristics of an evanescent coupler depend on the optical properties (i.e., the indices of refraction) of the material from which it is constructed, the wavelength(s) of the radiation being coupled, and the various dimensions of the waveguides. Evanescent couplers may be manufactured by bringing optical waveguides in close physical proximity (i.e., less than or on the order of a few wavelengths of the radiation being coupled). For fiber waveguides, careful local melting or fusing of the separate waveguides establishes the needed coupling proximity. Alternatively, waveguides may be manufactured by lithographically defining proximal waveguide paths on a planar waveguide "chip".

Figure 3A:
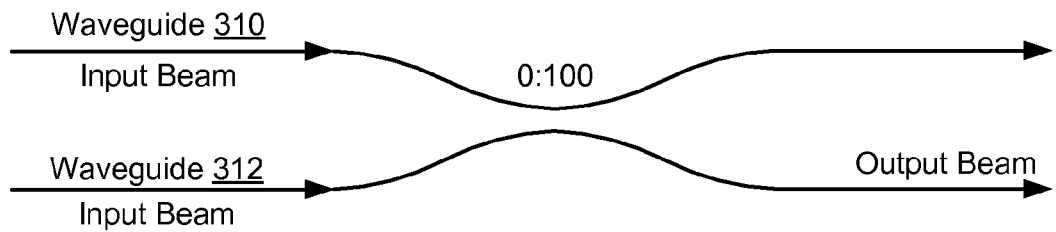
FIGS. 3A and 3B are schematic illustrations of a waveguide coupler according to embodiments.

FIG. 3A is a schematic illustration of a waveguide coupler according to embodiments. The embodiment depicted in FIG. 3A is an evanescently coupled 2×2 coupler, in which two input waveguides are brought close enough to each other to allow a portion of the longer wavelength electromagnetic radiation from one waveguide to transfer to the other waveguide. The region where the transfer occurs may be referred to as the interaction region. The separation between the two waveguide cores affects the amount of overlap of the evanescent portion of one waveguide mode with the core of the other waveguide, and therefore the amount of coupling. The extent to which the evanescent mode tails extend beyond one waveguide is a function of the wavelength of the guided light, the indices of the cores and cladding, and the various dimensions of the cores. Longer wavelengths generally result in more extension of the evanescent mode tails, and therefore more coupling. By proper choice of dimensions and index values, virtually 100% of the longer wavelength light can be coupled to the opposite waveguide while virtually none of the shorter wavelength light is coupled to its opposing waveguide.

In many instances, evanescent couplers are referred to by a "through:cross" nomenclature that specifies a ratio of the radiation that remains on the original waveguide to the radiation that is coupled to the opposing waveguide. Thus, an evanescent coupler that transmits substantially all the radiation from the first waveguide 310 to the second waveguide 315 may be referred to as a 0:100 coupler. These ratios are sometimes referred to as through-to-cross ratios, or coupling ratios. In this document, coupling ratios will be indicated for the operating wavelength of the instrument in which the coupler is employed (e.g. infrared). The couplers will be designed so that the shorter wavelengths (e.g. visible) will experience negligible coupling, and therefore this coupling ratio does not need to be specified.

In an alternate embodiment, the radiation on the first waveguide 310 is in the visible portion of the spectrum and the radiation on the second waveguide 315 is shorter than visible (e.g. ultraviolet). In such a case the interaction region may be altered to allow visible radiation to transition from first waveguide 310 to second waveguide 315. Visible and ultraviolet light both emerge towards the right on the lower waveguide 315.

Figure 3B:
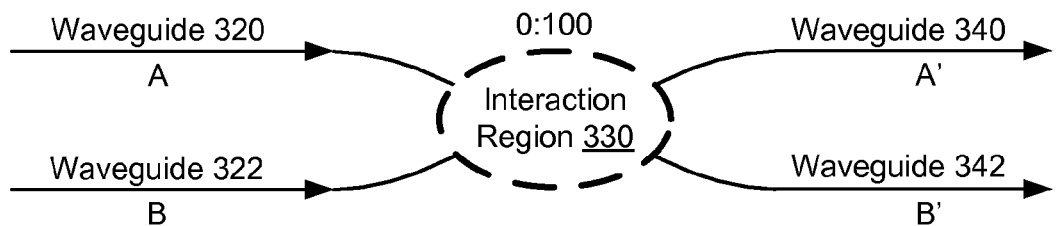

Because of the many physical mechanisms and embodiments possible to couple light from one waveguide to another, it is not possible in the most general sense to indicate that light entering a coupler function on a particular waveguide will exit that same physical waveguide at the output of the coupler. For this reason, the wavelength combining coupler function will be schematically illustrated as shown in FIG. 3B. In FIG. 3B, the wavelength combining coupler has two input waveguides, A and B (320 and 322), and one or more output waveguides, A' and B' (340 and 342). In FIG. 3B, there is no explicitly indicated connection between waveguides A, B, A' and B'. These guides might connect as shown in FIG. 3A if the coupling is accomplished by lowest-order evanescent means. However, the guides might connect differently if higher-order evanescent coupling, multimode mixing, resonant rings, or photonic bandgap techniques were used. Despite the generality of the actual connections within the coupler, using the A to A' notation allows the through:cross notation to specify which waveguide will carry what fraction of the output working light.

In some embodiments, waveguide couplers which combine radiation having a wavelength within the visible spectrum and radiation that is outside the visible spectrum may be combined with a radiation based analysis tool to provide a visual indication of the location of the tool's invisible beam. For example, in one embodiment waveguide couplers may be employed as part of an interferometer that utilizes radiation having a wavelength outside the visible spectrum.

Figure 4:
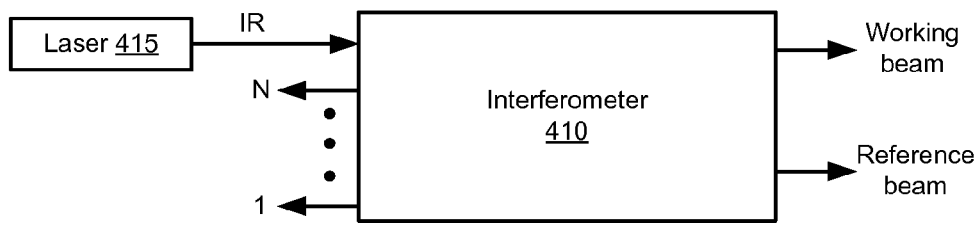
FIG. 4 is a schematic illustration of an interferometer assembly according to embodiments.

FIG. 4 is a schematic illustration of an interferometer assembly according to embodiments. Referring to FIG. 4, a radiation source such as, e.g., a laser 415 generates a radiation beam, which is coupled to an interferometer 410. In one embodiment the radiation source generates radiation in the infrared wavelength range (e.g., seven hundred eighty nanometers to 14 thousand nanometers). The interferometer 410 divides the input radiation into two measurement beams, which are output from the interferometer 410. For simplicity, one of the measurement beams is often called the working beam while the other is often referred to as the reference beam. The working and reference beams are reflected from surfaces such as, e.g., one or more mirrors, and passed back through the interferometer 410. The phase difference between the two measurement beams may then be calculated from the amplitudes of the N outputs shown exiting to the left.

Figure 5:
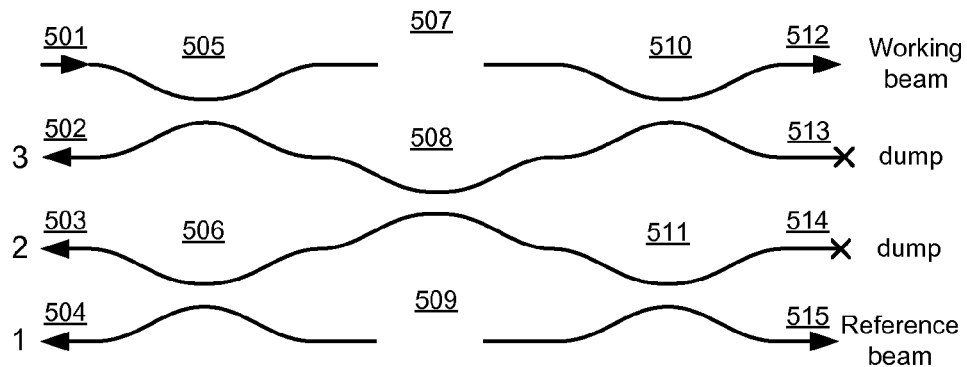
FIG. 5 is a schematic illustration of an interferometer according to embodiments.

FIG. 5 is a schematic illustration of an interferometer according to embodiments. For example, the interferometer depicted in FIG. 5 may be used to implement the interferometer 410 depicted in FIG. 4. Though many other architectures are available, it may be helpful to discuss this representative architecture in general so that it may be used later to illustrate the various embodiments which may be used to accomplish the desired result of a visible and invisible beam sharing a substantially common propagation path and focal spot.

The waveguide topology show in FIG. 5 serves two basic purposes. First, for right-propagating light entering the network on waveguide 501, the network splits this light and creates output working and reference beams on waveguides 512 and 515. Right-propagating light is also split onto waveguides 513 and 514, but this light is not needed and is dumped. Second, for left-propagating light entering waveguides 513 and 514, the network splits and mixes these beams in such a way that a portion of each beam exits each of the four waveguides 501-504. These beams contain the information needed to determine the relative phase between the light entering guides 512 and 515. The details of how these two functions are accomplished by this network are not necessary for understanding how visible and invisible light may be made to exit the working and/or reference ports of such an example network. What is important is the simple observation that the network in this case is designed to operate on infrared light, and that visible light does not couple across any of the couplers in the network schematic. Therefore visible light injected from the left side on any particular waveguide, will propagate through the network and remain on that particular waveguide. Therefore, if visible light is needed at the right side of the network on the working beam waveguide 512, then that visible light can simply be injected on the left side of the network into guide 501.

Figure 6:
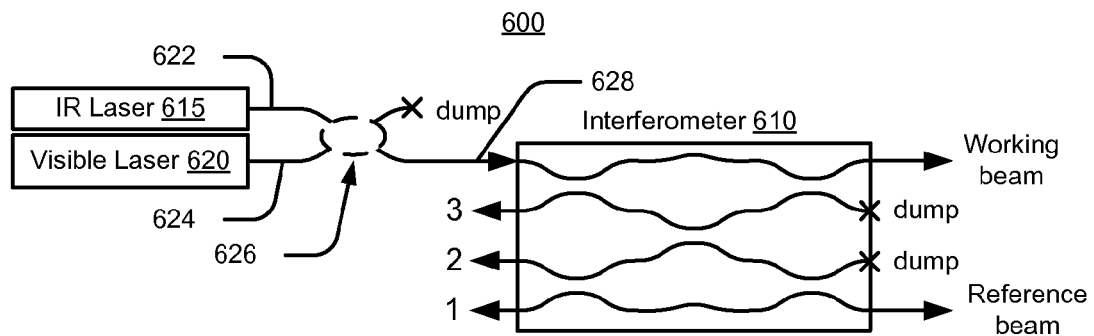
FIG. 6 is a schematic illustration of an interferometer assembly comprising an integrated visible pilot beam according to embodiments.

FIG. 6 is a schematic illustration of an interferometer assembly comprising an integrated visible pilot beam according to embodiments. In this embodiment the wavelength of the radiation used in the interferometer is in the infrared portion of the spectrum. Such an interferometer may benefit from having a visible beam to illuminate the working beam path and focal spot. Likewise, in configurations in which the reference beam is also projected from the instrument, the reference beam path may also be beneficially visualized by a visible pilot beam. Referring to FIG. 6, an interferometer assembly 600 includes an interferometer 610. A first waveguide 622 is coupled to a first radiation source such as, e.g., an infrared (IR) laser and a second waveguide 624 is coupled to a second radiation source such as, e.g., visible laser 620. Radiation generated by the IR laser 615 is received on the first waveguide 622 while radiation generated by the visible laser 620 is received on the second waveguide. Waveguides 622, 624 are coupled to a waveguide coupler 626, which may be embodied as an evanescent waveguide coupler as described with reference to FIG. 3. In the embodiment depicted in FIG. 6, the waveguide coupler 626 may be embodied as a 0:100 coupler, such that virtually all the radiation on waveguide 622 from IR laser 615 is coupled to waveguide 628. Any remaining radiation in waveguide 622 is terminated in a beam dump. Thus, in alternate embodiments, the waveguide coupler 626 may be other than a 0:100 coupler.

The combined visible and invisible radiation is input to the interferometer 610 on a third waveguide 628. The combined visible and invisible radiation propagates through the interferometer and a portion of each form the working beam of the interferometer 610, thereby providing a visual indication of the target area of the working beam of the interferometer.

Figure 7:
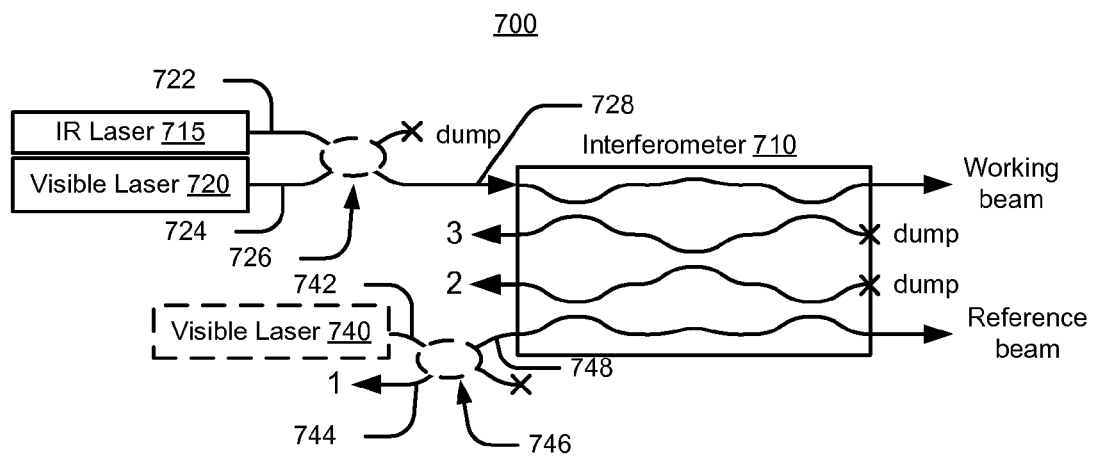
FIG. 7 is a schematic illustration of an interferometer assembly comprising an integrated visible pilot beam according to embodiments.
Figure 8:
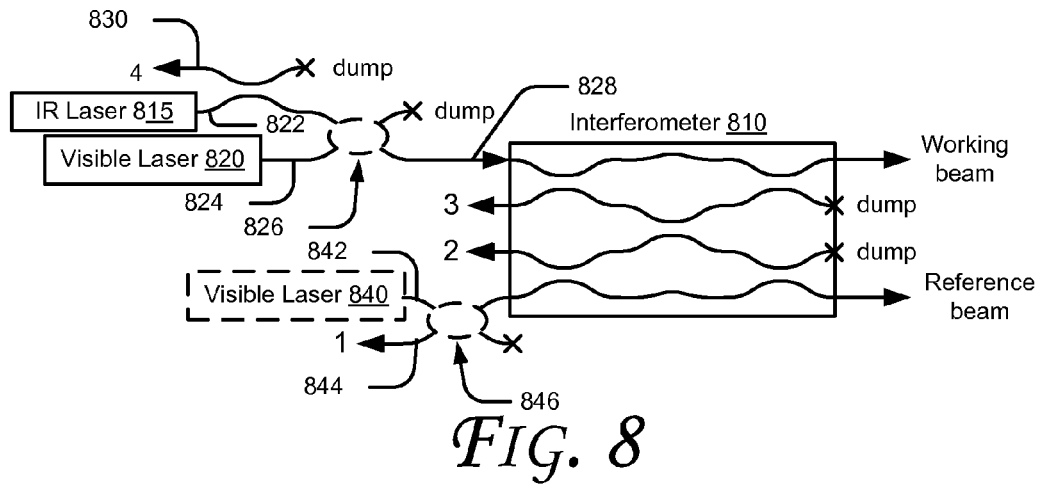
FIG. 8 is a schematic illustration of an interferometer assembly comprising an integrated visible pilot beam according to embodiments.

With modifications to the embodiment depicted in FIG. 6, visible radiation can be made to come from both the working and reference ports. FIGS. 7-8 are schematic illustrations of interferometer assemblies comprising an integrated visible pilot beam according to embodiments. Referring first to FIG. 7, an interferometer assembly 700 includes an interferometer 710. A first waveguide 722 is coupled to a first radiation source such as, e.g., an infrared (IR) laser, and a second waveguide 724 is coupled to a second radiation source such as, e.g., visible laser 720. Radiation generated by the IR laser 715 is received on the first waveguide 722 while radiation generated by the visible laser 720 is received on the second waveguide. Waveguides 722, 724 are coupled to a waveguide coupler 726, which may be embodied as an evanescent waveguide coupler as described with reference to FIG. 3. In the embodiment depicted in FIG. 7, the waveguide coupler 726 may be embodied as a 0:100 coupler, such that virtually all the radiation on waveguide 722 from IR laser 715 is coupled to waveguide 728. Any remaining radiation in waveguide 722 is terminated in a beam dump. Thus, in alternate embodiments, the through-to-cross ratio may differ from 0:100.

The combined visible and invisible radiation is input to the interferometer 710 on a third waveguide 728. The combined visible and invisible radiation propagates through the interferometer and exits as the working beam of the interferometer 710, thereby providing a visual indication of the target area of the working beam of the interferometer.

Waveguide assembly 700 further includes a third waveguide 742 coupled to a visible radiation source. In the embodiment depicted in FIG. 7, waveguide 742 is coupled to the output of a visible laser 740. In alternate embodiments waveguide 742 may be coupled to the output of visible laser 720. Radiation generated by the visible laser 740 is received on the waveguide 742. Waveguides 742 and 744 are coupled to a waveguide coupler 746, which may be embodied as an evanescent waveguide coupler as described with reference to FIG. 3. In the embodiment depicted in FIG. 7, the waveguide coupler 746 may be embodied as a 0:100 coupler of radiation in the infrared wavelength range. Thus, radiation generated by visible laser 740 passes through the interferometer 710 and exits to illuminate the reference beam. Radiation in the infrared wavelength range that is reflected back through the reference beam waveguide is coupled onto waveguide 744 to output 1.

FIG. 8 is a schematic illustration of an interferometer assembly similar to the embodiment depicted in FIG. 7, and in the interest of brevity the explanation of common features will not be repeated. The embodiment depicted in FIG. 8 further includes an output waveguide 830 coupled to waveguide 822 via a 50:50 coupler. In operation, IR radiation reflected along the path of the working beam is coupled from waveguide 828 to waveguide 822, then onto waveguide 830, where half of the beam intensity it is available as a fourth output channel.

Figure 9:
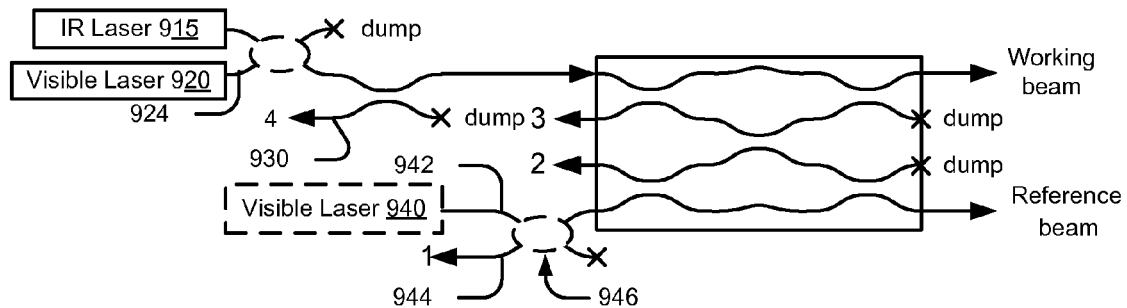
FIG. 9 is a schematic illustration of an interferometer assembly comprising an integrated visible pilot beam according to embodiments.

FIG. 9 is a schematic illustration of an interferometer assembly similar to the embodiment depicted in FIGS. 7 and 8, in which the order of the 50:50 and 0:100 couplers has been interchanged. In the interest of brevity the explanation of common features will not be repeated. The embodiment depicted in FIG. 9 further includes an output waveguide 930 coupled to waveguide 928 via a 50:50 coupler. In operation, IR radiation reflected along the path of the working beam is coupled from waveguide 928 onto waveguide 930, where half of the beam intensity is available as a fourth output channel.

Figure 10:
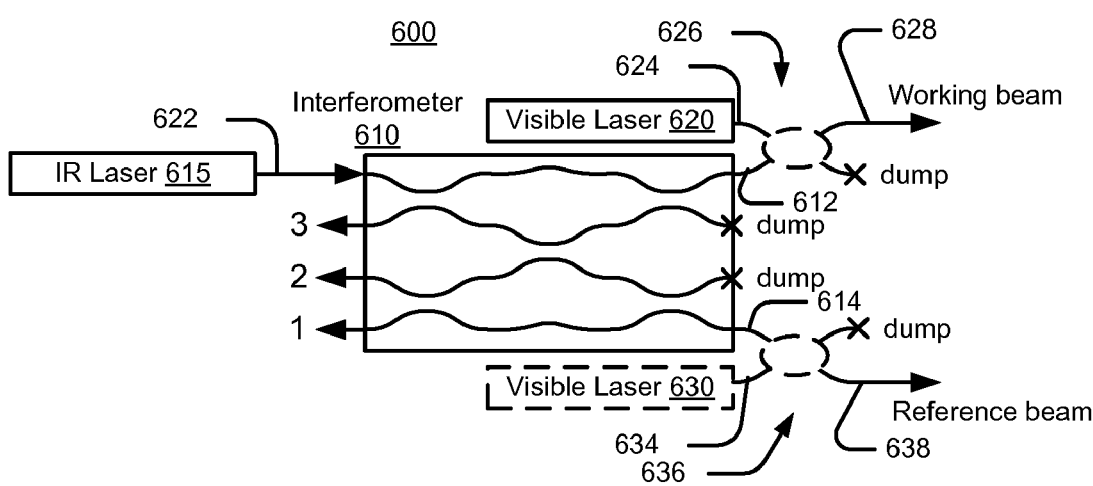
FIG. 10 is a schematic illustration of an interferometer assembly comprising an integrated visible pilot beam according to embodiments.

FIG. 10 is a schematic illustration of another embodiment of an interferometer assembly 600 comprising an integrated visible pilot beam. The primary difference between the embodiment depicted in FIG. 6 and the embodiment depicted in FIG. 10 is that the visible radiation is coupled to the invisible radiation after the radiation exits the interferometer in the second figure. Thus, referring to FIG. 10, radiation from an IR laser 615 is received on a first waveguide 622, which is coupled to interferometer 610. A portion of the IR radiation exits the interferometer 610 as the working beam on a waveguide 612 and a portion of the IR radiation exits the interferometer 610 as a reference beam on a waveguide 614.

Radiation from a visible radiation source such as a visible laser 620 is injected onto a waveguide 624. Waveguides 612 and 624 are coupled to a waveguide coupler 626, which may be embodied as an evanescent waveguide coupler as described with reference to FIG. 3. In the embodiment depicted in FIG. 10, the waveguide coupler 626 may be embodied as a 0:100 coupler, such that virtually all the radiation on waveguide 612 from interferometer 610 is coupled to waveguide 628. Any remaining radiation in waveguide 612 is terminated in a beam dump. Thus, in alternate embodiments, waveguide coupler 626 may be other than a 0:100 coupler.

In some embodiments, additional radiation generated by another visible laser 630 may be output onto another waveguide 634, which is coupled to the waveguide that carries the reference beam output from interferometer 610, thereby providing a visual indication of the target area of the reference beam of the interferometer. Alternatively, interferometer assembly 600 may use radiation from a single visible laser to illuminate both the working and reference beam paths. To enable this, the output the visible laser may be split using a beam splitter or a visible evanescent coupler.

Thus, described herein are various interferometer assemblies and techniques to combine a visible radiation beam with a non-visible radiation beam used in interferometer assemblies. While the invention has been particularly shown and described with reference to a preferred embodiment and various alternate embodiments, it will be understood by persons skilled in the relevant art that various changes in form and details can be made therein without departing from the spirit and scope of the invention. While the invention has been particularly shown and described with reference to a preferred embodiment and various alternate embodiments, it will be understood by persons skilled in the relevant art that various changes in form and details can be made therein without departing from the spirit and scope of the invention.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A radiation-based analysis system, comprising:
    a wavelength combining coupler comprising:
        a first waveguide configured to receive a first radiation having a first wavelength longer than any wavelength within the visible spectrum;
        a second waveguide configured to receive a second radiation having a second wavelength within the visible spectrum directly from a laser source;
        an interaction region where the first and second radiations are at least partially combined;
        at least one of the first waveguide or the second waveguide carrying the combined radiation, and
        an interferometer configured to supply the first radiation to the first waveguide, and
    an output from a waveguide selected from the first waveguide or the second waveguide configured to direct at least a portion of the first and second radiations onto a measurement beam of the analysis system.

2. The radiation-based analysis system of claim 1, wherein the first wavelength is selected from the range seven hundred eighty nanometers to fourteen thousand nanometers.

3. The radiation-based analysis system of claim 1, wherein the second wavelength is selected from the range four hundred nanometers to seven hundred fifty nanometers.

4. The radiation based analysis system of claim 1, wherein a termination of the waveguide not connected to the interferometer function block is configured to prevent significant amounts of remaining first and second radiations from propagating back in the directions from which they came.

5. The radiation-based analysis system of claim 1, wherein the interaction region is configured to produce evanescent coupling.

* * * * *